(12) United States Patent
Park et al.

(10) Patent No.: US 11,684,538 B2
(45) Date of Patent: Jun. 27, 2023

(54) VISION TRAINING DEVICE WITH REFRACTIVE INDEX-ADJUSTABLE LENS

(71) Applicant: Edenlux Corporation, Gyeongsangnam-do (KR)

(72) Inventors: Sung Yong Park, Busan (KR); Kyung Hyun Noh, Busan (KR)

(73) Assignee: EDENLUX CORPORATION, Gyeongsangnam-do (KR)

( * ) Notice: Subject to any disclaimer, the term of this patent is extended or adjusted under 35 U.S.C. 154(b) by 288 days.

(21) Appl. No.: 16/898,963

(22) Filed: Jun. 11, 2020

(65) Prior Publication Data

US 2020/0323728 A1 Oct. 15, 2020

Related U.S. Application Data

(63) Continuation-in-part of application No. PCT/KR2017/014587, filed on Dec. 12, 2017.

(51) Int. Cl.
*A61H 5/00* (2006.01)
*G02F 1/29* (2006.01)

(52) U.S. Cl.
CPC ............. *A61H 5/00* (2013.01); *G02F 1/29* (2013.01); *A61H 2201/1604* (2013.01); *A61H 2201/165* (2013.01)

(58) Field of Classification Search
USPC ........................................................ 351/203
See application file for complete search history.

(56) References Cited

U.S. PATENT DOCUMENTS

2005/0140922 A1 6/2005 Bekerman
2016/0193104 A1* 7/2016 Du ........................... A61B 3/12
    351/203

(Continued)

FOREIGN PATENT DOCUMENTS

JP      2002-323680      11/2002
KR   10-2015-0056907      5/2015
(Continued)

OTHER PUBLICATIONS

International Searching Authority, "International Search Report," dated Sep. 12, 2018, in International application No. PCT/KR2017/014587.

(Continued)

*Primary Examiner* — Collin X Beatty
*Assistant Examiner* — Grant A Gagnon
(74) *Attorney, Agent, or Firm* — Trop, Pruner & Hu, P.C.

(57) ABSTRACT

It is an object of the present invention to provide a vision training device having an excellent vision training efficiency as vision training is performed in consideration of a status of personal vision. In order to achieve the above object, a vision training device according to the present invention includes a refractive index-adjustable lens disposed in a field of view direction of an eye of a user and having a refractive index which is changed with supply of an electric current, a lens drive unit including one or more electrodes electrically connected to the refractive index-adjustable lens and a voltage adjusting unit capable of adjusting a voltage applied to the one or more electrodes, and a control unit that that controls the voltage adjusting unit such that a refractive index of the refractive index-adjustable lenses is adjusted, sets at least one training range within a refractive index adjustment range of the refractive index-adjustable lenses, (Continued)

and adjusts the refractive index of the refractive index-adjustable lenses in the training range.

22 Claims, 7 Drawing Sheets

(56) References Cited

U.S. PATENT DOCUMENTS

2016/0282635 A1* 9/2016 Yang .................. G02C 11/10
2016/0282636 A1* 9/2016 Wang .................. G02C 7/083
2017/0160440 A1* 6/2017 Yadin .................. G02B 3/10

FOREIGN PATENT DOCUMENTS

KR   10-2017-0008642   1/2017
KR   10-2017-0121477   11/2017

OTHER PUBLICATIONS

Yi-Hsin Lin, et al., "An electrically tunable optical zoom system using two composite liquid crystal lenses with a large zoom ratio," Feb. 28, 2011 / vol. 19, No. 5 / Optics Express 4714, 8 pages.

* cited by examiner

VISION TRAINING DEVICE WITH REFRACTIVE INDEX-ADJUSTABLE LENS

This application is a continuation-in-part of International Application No. PCT/KR2017/014587, filed Dec. 12, 2017. The content of the above application is hereby incorporated by reference

BACKGROUND

The present invention relates to a vision training device with a refractive index-adjustable lens.

Human vision is particularly associated with a ciliary muscle among muscles of the eyes. Thus, human vision can be improved or maintained by training of contracting or relaxing the ciliary muscle. However, since human ciliary muscle has different abilities for individuals, it is effective to perform customized vision training corresponding to each individual's vision.

However, in a vision training device of a related art, training the ciliary muscle of the user is performed without considering the status of personal vision, so the training efficiency is relatively low.

Furthermore, the vision training device of the related art includes a motor, an electric driving unit, and the like to change the refractive index of the lens and thus has a problem that its internal structure is relatively complicated, leading to a high manufacturing cost.

BRIEF SUMMARY

It is an object of the present invention to provide a vision training device having an excellent vision training efficiency as vision training is performed in consideration of a status of personal vision.

Another object of the present invention is to provide a vision training device capable of continuously or intermittently adjusting a refractive index with a compact structure.

In order to achieve the above object, a vision training device according to the present invention includes a refractive index-adjustable lens disposed in a field of view direction of an eye of a user and having a refractive index which is changed with supply of an electric current, a lens drive unit including one or more electrodes electrically connected to the refractive index-adjustable lens and a voltage adjusting unit capable of adjusting a voltage applied to the one or more electrodes, and a control unit that controls the voltage adjusting unit such that a refractive index of the refractive index-adjustable lenses is adjusted, sets at least one training range within a refractive index adjustment range of the refractive index-adjustable lenses, and adjusts the refractive index of the refractive index-adjustable lenses in the training range.

Preferably, the refractive index-adjustable lens is a transparent liquid crystal lens whose inside crystal structure changes according to the voltage applied to the one or more electrodes.

Preferably, the refractive index-adjustable lens is a liquid lens that includes a transparent liquid-like non-polar substance and a transparent liquid-like polar substance and controls a refractive index of light according to the voltage applied to the one or more electrodes.

Preferably, the control unit sets an accommodation range corresponding to a range between a first adjustment refractive index and a second adjustment refractive index within the refractive index adjustment range, and the training range includes the accommodation range.

Preferably, a user input unit that receives a user input signal from a user is further included, and the first adjustment refractive index and the second adjustment refractive index are set by an input of the user input signal.

Preferably, a sensor that determine if the eye of the user transitions from an accommodated state to a non-accommodated state or transitions from the non-accommodated state to the accommodated state and generates an accommodation state change confirmation signal is further included, and the control unit sets the first adjustment refractive index and the second adjustment refractive index based on the accommodation state change confirmation signal.

Preferably, the control unit sets a near point of accommodation position and a far point of accommodation position within the accommodation range, and the training range includes at least a part of a fast accommodation range between the near point of accommodation position and the far point of accommodation position.

Preferably, the control unit measures a continuous or intermittent accommodation speed within the accommodation range using a user input unit or a sensor module, and determines a training speed in the training range of the display and the lens based on the measured accommodation speed.

Preferably, a frame including an eyepiece section and a mounting section, the refractive index-adjustable lens being mountable in the eyepiece section, a separate display being mountable in front of the refractive index-adjustable lens is further included.

Preferably, the refractive index-adjustable lens adjusts the refractive index by adjusting internal liquid pressure of the refractive index control lens with physical or electrical power through a lens module made of at least one transparent liquid solution and the control unit.

The vision training device according to the present invention has an excellent vision training efficiency since vision training is performed in consideration of the status of personal vision. Further, the vision training device according to the present invention is capable of continuously or intermittently adjusting the refractive index with a compact structure.

DETAILED DESCRIPTION OF THE EMBODIMENT(S)

Figure 1:
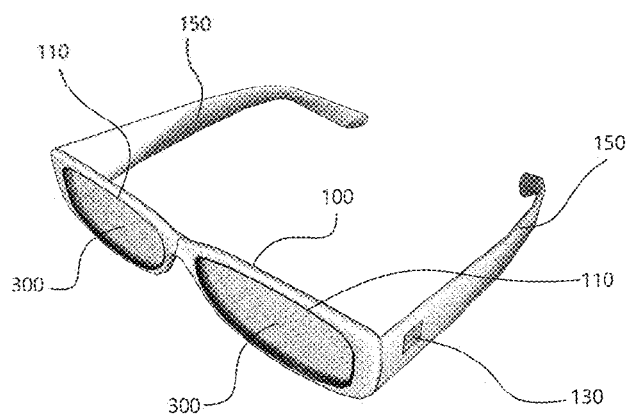
FIG. 1 is a perspective view illustrating a vision training device according to the present invention.

FIG. 1 is a perspective view illustrating a vision training device according to the present invention. As illustrated in FIG. 1, a vision training device according to the present invention includes a frame 100 having eyepiece sections 110. Refractive index-adjustable lenses 300 are installed in the eyepiece sections 110, and the refractive index of each of the refractive index-adjustable lenses 300 is changed with the supply of an electric current. The frame 100 includes a pair of legs 150 extending rearward from both ends of the eyepiece sections 110 so that it can be worn on the user's face. The frame 100 includes a user input unit 130 through which a user can input an arbitrary signal and a control unit 500. The user input unit 130 and/or the control unit 500 may be electrically connected to the vision training device as a separate configuration.

Figure 2A:
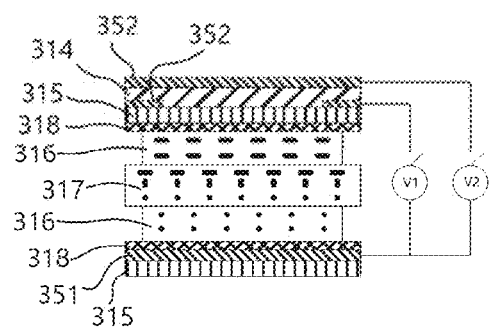
FIGS. 2(A) and 2(B) are reference diagrams for describing a refractive index-adjustable lens 300 and a lens drive unit 350 according to the present invention.
Figure 2B:
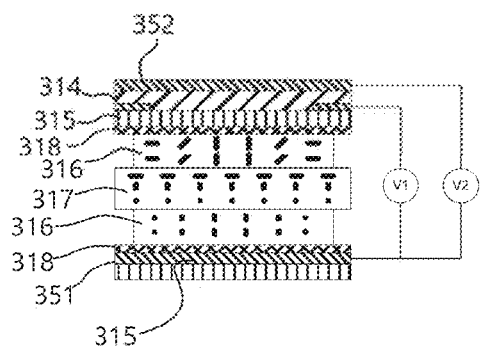

FIGS. 2(A) and 2(B) are reference diagrams for describing the refractive index-adjustable lens 300 and a lens drive unit 350 (see FIG. 3) according to the present invention. As can be seen in FIGS. 2(A) and 2(B), the refractive index-adjustable lens 300 includes an insulating layer 314, a glass substrate 315, a liquid crystal layer 316, a uniaxial polymeric layer 317, and an alignment layer 318.

The vision training device includes the lens drive unit 350 that is electrically connected to the refractive index-adjustable lens 300 and changes the refractive index of the refractive index-adjustable lens 300. The lens drive unit 350 includes a first pair of electrodes 351 and 352 to apply a voltage V1 and a second pair of electrodes 351 and 352 to apply a voltage V2 and a voltage adjusting unit that adjusts the voltage V1 applied to a first pair of electrodes 351 and 352 and the voltage V2 applied to a second pair of electrodes 351 and 352. The first and second pairs of electrodes 351 and 352 are positive and negative electrodes, and the voltage adjusting unit adjusts the voltages applied to the refractive index-adjustable lenses 300 by adjusting the intensity of an electric current and/or the magnitude of resistance. The electrode 352 to apply the voltage V1 has a ring-like shape to apply the voltage only to the edge part of the liquid crystal layer 316 without applying the voltage to the central part of the liquid crystal layer 316, and the electrode 352 to apply the voltage V2 has a circular shape to apply the voltage to the entire area of the liquid crystal layer 316.

FIG. 2(A) illustrates a state before an electric current is supplied to the refractive index-adjustable lens 300, and FIG. 2(B) illustrates a state in which the electric current is being supplied to the refractive index-adjustable lens 300. As can be seen in FIGS. 2(A) and 2(B), the alignment of the inside crystal structure of the liquid crystal layer 316 is controlled with the supply of an electric current. The alignment of the inside crystal structure of the liquid crystal layer 316 varies according to a voltage relation between the voltages V1 and V2 such as a voltage difference or whether V1 is larger than V2, and the refractive index can be changed by adjusting the applied voltages according to this principle. For example, when V1>V2, the LC layer acts as a positive lens because the tilt angles of LC directors of the LC layers in the center of the hole-electrode are smaller than those near the edge of the hole-electrode. Because of the polymeric layer with lens power ~-5.3 $m^{-1}$, the refractive index-adjustable lens 300 is a positive lens with the switchable lens power from 21.8 $m^{-1}$ to 0 $m^{-1}$ when 0<V2<38 Vrms at V1=80 Vrms and the refractive index-adjustable lens 300 is a negative lens with the switchable lens power from 0 to -5.3 $m^{-1}$ when V2>38 Vrms at V1=80 Vrms. At V1=80 Vrms and at V2=38 Vrms, the lens power of LC layer equals to the lens power of polymeric layer. As a result, the lens power of the refractive index-adjustable lens 300 is zero. When V1<V2, the LC layer acts as a negative lens because the tilt angles of LC directors of the LC layers in the center of the hole-electrode are larger than those near the edge of the hole-electrode. At V1<40 Vrms and V2=40 Vrms, the refractive index-adjustable lens 300 is a negative lens with switchable lens power from -13.5 $m^{-1}$ to -5.3 $m^{-1}$ since both of the LC layer and the polymer layer are negative lenses. Components of the refractive index-adjustable lens 300 can be variously changed deepening on a design. The refractive index-adjustable lens 300 according to the present invention may be replaced with a liquid lens.

Figure 3:
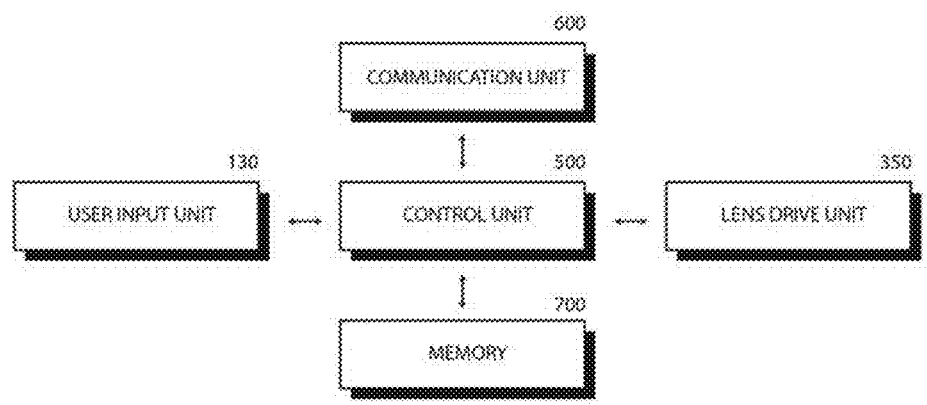
FIG. 3 is a configuration diagram of a vision training device according to the present invention.

FIG. 3 is a configuration diagram of the vision training device according to the present invention. As illustrated in FIG. 3, the vision training device includes the control unit 500. The control unit 500 can control the voltage adjusting unit of the lens drive unit 350 and can set at least one training range within a refractive index adjustment range (see D1 to D2 in see FIG. 4) of the refractive index-adjustable lens 300 and adjust the refractive index of the refractive index-adjustable lens 300 in the training range. In addition, the vision training device includes a communication unit 600 that is connected to an external device and exchanges information with the external device and a memory 700 that stores information.

Figure 4:
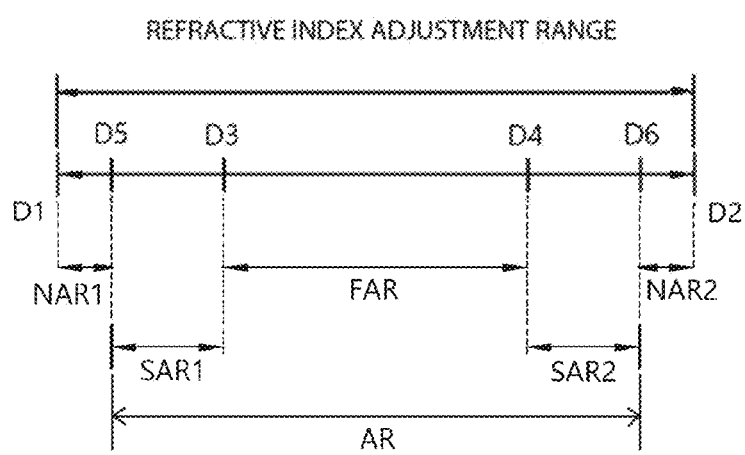
FIG. 4 is a reference diagram for describing a training range of the vision training device according to the present invention.

FIG. 4 is a reference diagram for describing the training range of the vision training device according to the present invention. As can be seen in FIG. 4, the control unit 500 sets an accommodation range AR corresponding a range between a first adjustment refractive index D5 and a second adjustment refractive index D6 within the refractive index adjustment range (D1 to D2), and the training range includes the accommodation range AR.

Figure 5:
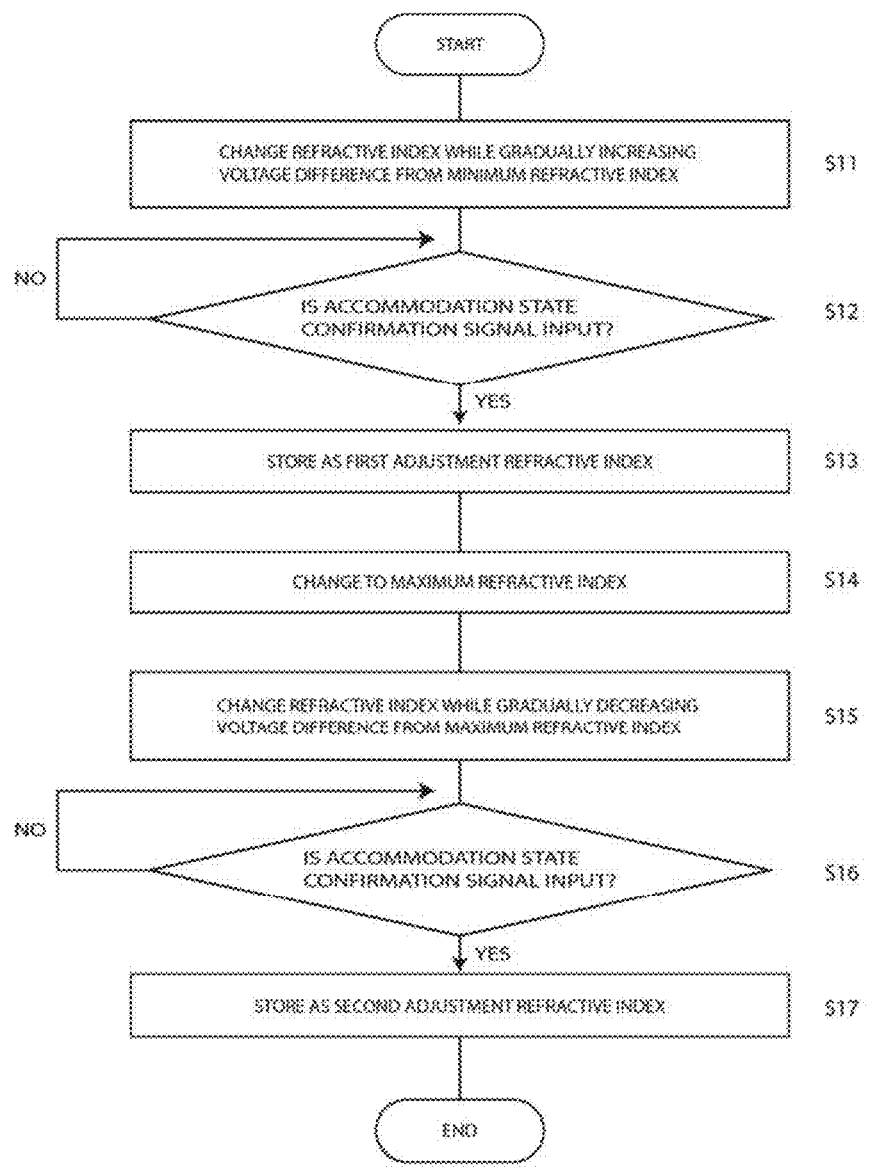
FIG. 5 is a flow chart illustrating a process of measuring a first adjustment refractive index D5 and a second adjustment refractive index D6 and setting an accommodation range AR according to the present invention.

FIG. 5 is a flow chart illustrating a process of measuring the first adjustment refractive index D5 and the second adjustment refractive index D6 and setting the accommodation range AR according to the present invention. Referring to FIGS. 4 and 5, first, the user wears the vision training device and then executes a training range setting mode. At this time, it is desirable that the process be performed for a target object placed at an appropriate distance in front of the user. Then, the control unit 500 gradually changes the refractive index of the refractive index-adjustable lens 300 while gradually increasing the voltage difference from a minimum refractive index D1 at which the voltage difference for the refractive index-adjustable lens 300 is minimum (S11). The control unit 500 checks whether there is an accommodation state change confirmation signal from the user input unit 130 (S12). The accommodation state change confirmation signal is a signal transmitted from the user input unit 130 to the control unit 500 by the user when the users eye transitions from a non-accommodated state to an accommodated state. The user can input the accommodation state change confirmation signal by pushing the user input unit 130 when the target object which is placed in front of the user and blurred is seen clearly, that is, when the accommodation state for the target object is changed.

When the accommodation state change confirmation signal is input from the user input unit 130, the control unit 500 stores a voltage to the refractive index-adjustable lens 300 of the lens drive unit 350 when the accommodation state change confirmation signal is input or information of the refractive index changed by the voltage information as the first adjustment refractive index D5 (S13).

Thereafter, the control unit 500 performs control such that a previously set voltage is applied to the refractive index-adjustable lens 300 by the lens drive unit 350 so that the refractive index of the refractive index-adjustable lens 300 becomes a maximum refractive index D2 (S14). Then, the control unit 500 gradually changes the refractive index of the refractive index-adjustable lens 300 from the maximum refractive index D2 to the minimum refractive index D1 while gradually decreasing the voltage difference to the refractive index-adjustable lens 300 (S15). The control unit 500 checks whether the accommodation state change confirmation signal is input from the user input unit 130 (S16). The accommodation state change confirmation signal is a signal transmitted from the user input unit 130 to the control unit 500 by the user when the eye of the user transitions from the non-accommodated state to the accommodated state. The user can input the accommodation state change confirmation signal by pushing the user input unit 130 when the target object which is placed in front of the user and blurred is seen clearly, that is, when the accommodation state for the target object is changed.

When the accommodation state change confirmation signal is input from the user input unit 130, the control unit 500 stores the voltage to the refractive index-adjustable lens 300 of the lens drive unit 350 when the accommodation state change confirmation signal is input or information of the refractive index changed by the voltage information as the second adjustment refractive index D6 (S13). Each of the first adjustment refractive index D5 and the second adjustment refractive index D6 may be measured through a separate process. The refractive index may be changed continuously or may be changed intermittently with a predetermined waiting time.

The first adjustment refractive index D5 and the second adjustment refractive index D6 according to the present invention can be measured in various ways. For example, the first adjustment refractive index D5 and the second adjustment refractive index D6 can be continuously measured while increasing the refractive index from the minimum refractive index D1 to the maximum refractive index D2. For example, voltage information corresponding to the accommodation state change confirmation signal input from the user input unit 130, when the target object which is blurred is clearly seen, that is, when the accommodation state is changed as the refractive index increases from the minimum refractive index D1, is stored as the first adjustment refractive index D5, and voltage information corresponding to the accommodation state change confirmation signal input from the user input unit 130, when the target object which is clearly seen is blurred, that is, when the accommodation state is changed as the refractive index of the refractive index-adjustable lens 300 is continuously increased by the controller, is stored as the second adjustment refractive index D6. Of course, the first adjustment refractive index D5 and the second adjustment refractive index D6 may be measured while decreasing the refractive index from the maximum refractive index D2 to the minimum refractive index D1.

A middle point of a statistically average accommodation range at the age of the user or a middle point of a previously input accommodation range of a user may be set as a reference position, and the first refractive index and the second refractive index may be measured while changing the refractive index from the reference position toward the minimum refractive index D1 or the maximum refractive index D2. For example, the accommodation state change confirmation signal input from the user input unit 130, when the target object which is clearly seen is blurred, that is, when the accommodation state is changed as the refractive index changes toward the minimum refractive index D1 based on the middle point of the accommodation range in which the object is clearly seen, may be stored as the first adjustment refractive index D5, and the accommodation state change confirmation signal input from the user input unit 130, when the target object which is clearly seen is blurred, that is, when the accommodation state is changed as the refractive index changes toward the maximum refractive index D2, may be stored as the second adjustment refractive index D6.

The first adjustment refractive index D5 and the second adjustment refractive index D6 may be measured differently depending on a speed at which the refractive index is changed. For example, as the speed at which the refractive index is changed increases, a smaller interval between the first adjustment refractive index D5 and the second adjustment refractive index D6 is measured, and as the speed at which the refractive index is changed decreases, a larger distance between the first adjustment refractive index D5 and the second adjustment refractive index D6 is measured.

A plurality of first adjustment refractive indexes D5 and a plurality of second adjustment refractive indexes D6 which are measured in various ways as described above may be slightly different in position from each other. In this case, preferably, the second adjustment refractive index D6 measured while increasing the refractive index from the minimum refractive index D1 or the middle point of the accommodation range according to the statistics of the age of the user and the first adjustment refractive index D5 measured while decreasing the refractive index from the maximum refractive index D2 or the middle point of the accommodation range according to the statistics of the age of the user may be used as the first adjustment refractive index D5 and the second adjustment refractive index D6.

Further, the vision training device may include a sensor module that detects whether the eye of the user is in the accommodated state or the non-accommodated state by emitting infrared rays or light toward the eye of the user and receiving infrared rays or light reflected from the eye of the user. The sensor module may repeatedly check if there is a change in the accommodation state of the eye of the user at set intervals. For example, the sensor module may check if the eye of the user transitions from the accommodated state to the non-accommodated state (or check if the eye of the user transitions from the non-accommodated state to the accommodated state) when the refractive index of the refractive index-adjustable lens 300 is changed, and transmit an accommodation state change confirmation signal to the control unit 500 when it is determined that the eye of the user transitions from the accommodated state to the non-accommodated state (or when it is determined that the eye of the user transitions from the non-accommodated state to the accommodated state). The control unit 500 sets the first adjustment refractive index D5 and the second adjustment refractive index D6 based on the accommodation state change confirmation signal from the sensor module.

The sensor module may employ a principle similar to an examination principle of an auto refractor. For example, the sensor module may include a light output unit that outputs infrared light or light toward the eye of the user, a light detecting unit that detects reflected light reflected from the eye of the user, and a refraction evaluating unit that calculates the focal length of the detected reflected light and calculates a position at which infrared ray or light output toward the eye focus on the eye using the focal length.

The control unit 500 sets the accommodation range AR based on the determined first adjustment refractive index D5 and the second adjustment refractive index D6. The accommodation range AR corresponds to the region between the first adjustment refractive index D5 and the second adjustment refractive index D6. Ranges NAR1 and NAR2 outside the accommodation range AR are non-accommodation ranges.

The control unit 500 sets the training range within the refractive index adjustment range D1 to D2 of the refractive index-adjustable lens 300, and it is effective in improving the vision when the training range includes the accommodation range AR. The training range may be set to include at least a part of the non-accommodation range NAR1 or NAR2. When the training range is set, the vision training is performed by continuously or intermittently changing the refractive index of the refractive index-adjustable lens 300 within the training range. Here, it is effective in improving the vision when the refractive index change speed is set in consideration of the status of personal vision of the user.

Figure 6:
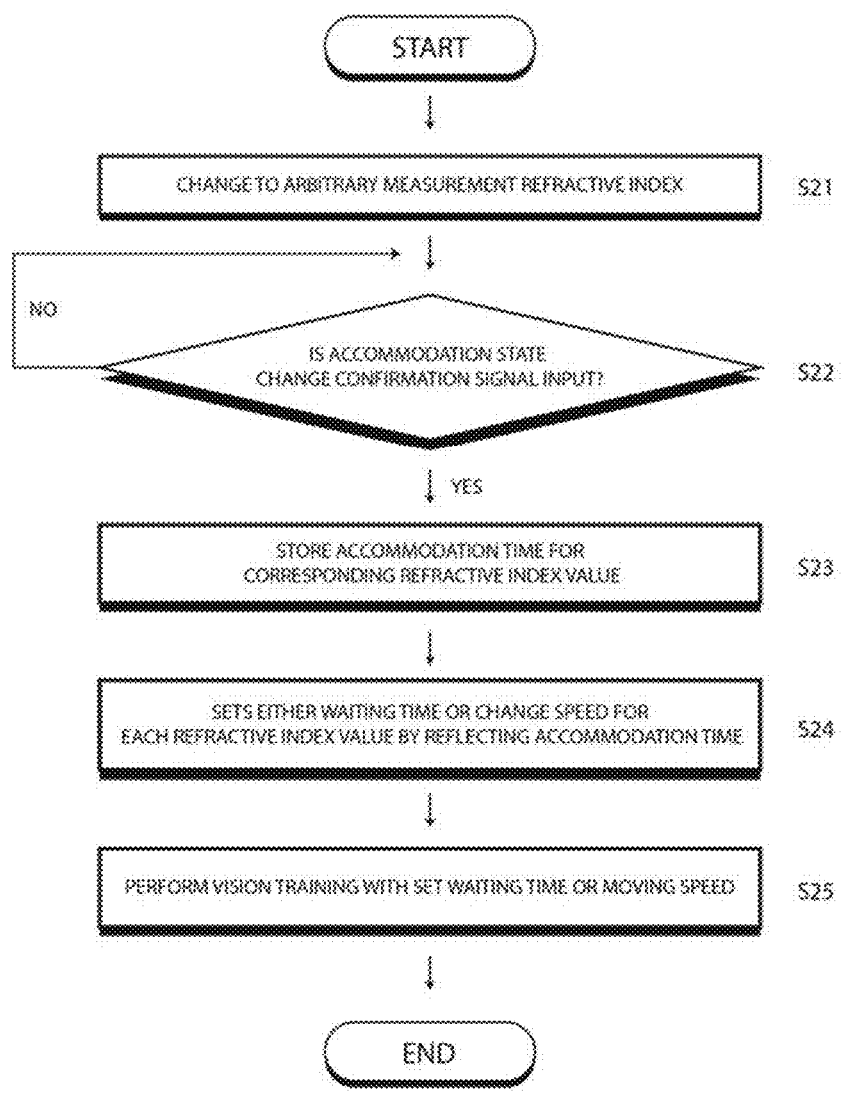
FIG. 6 is a flow chart illustrating an example of determining a refractive index change speed in consideration of a status of personal vision of a user.
Figure 7:
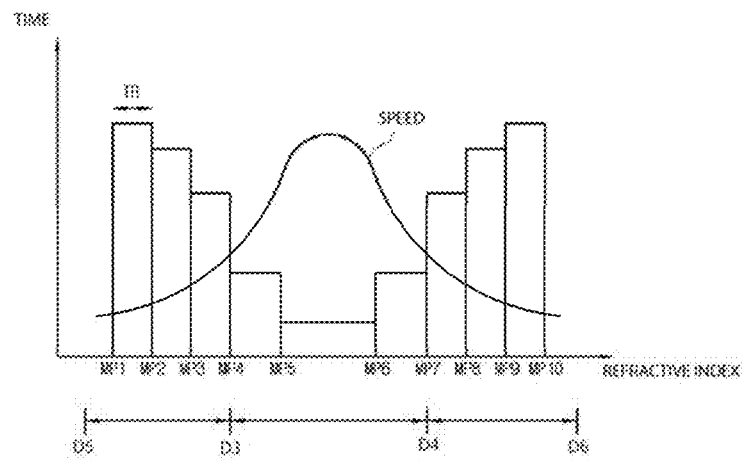
FIG. 7 is a reference diagram for describing a vision training process according to an example of FIG. 6.

FIG. 6 is a flowchart illustrating an example of determining the refractive index change speed in consideration of the status of personal vision of the user, and FIG. 7 is a reference diagram for describing a vision training process according to the example of FIG. 6. Referring to FIGS. 6 and 7, in order to set the continuous refractive index change speed and the intermittent waiting time so which the status of personal vision of each user is reflected, the control unit 500 first adjusts the refractive index value of the refractive index-adjustable lens 300 to an arbitrary measurement refractive index (S21). For the sake of convenience of description, it is assumed that the refractive index of the refractive index-adjustable lens 300 is changed from a first measurement refractive index MP1 to a second measurement refractive index MP2 among a plurality of refractive index values of the refractive index-adjustable lens 300.

The control unit 500 checks whether the accommodation state change confirmation signal is input from the user input unit 130 or the sensor module (S22). The accommodation state change confirmation signal is a signal indicating that the target object recognized by the user has become clear or that the eye of the user enters the accommodated state.

The user can input the accommodation state change confirmation signal by pushing the user input unit 130 when the target object becomes clear at the second measurement refractive index MP2. When the accommodation state change confirmation signal is input from the sensor module, the sensor module repeatedly checks the accommodated state of the eye of the user at set intervals, and transmits the accommodation state change confirmation signal to the control unit 500 when the eye of the user enters the accommodated state.

When the accommodation state change confirmation signal is input, the control unit 500 stores the accommodation time for the measurement refractive index MP2. Here, the accommodation time refers to a time taken until the accommodation state change confirmation signal is input after it is adjusted to the second measurement refractive index MP2. The accommodation time has a different value depending on the status of personal vision of the user.

The accommodation time may be measured for each of a plurality of measurement refractive indexes MP1 to MP10. It is preferable to measure the accommodation time for each measurement refractive index separately according to the increase or decrease direction of the refractive index. This is because the accommodation time even for the same measurement refractive index may vary depending on the refractive index value before the target object is recognized.

When the accommodation time for each of the plurality of measurement refractive indexes is determined, the control unit 500 sets either the intermittent waiting time or the continuous refractive index change speed V for each refractive index value by reflecting the determined accommodation time. The intermittent waiting time is a time during which the refractive index remains at the corresponding refractive index value, and the continuous refractive index change speed V means a numerical degree indicating how much the refractive index is continuously changed for a specific time.

After the intermittent waiting time or the continuous refractive index change speed V is determined, the control unit 500 controls the voltage relation for the refractive index-adjustable lens 300 of the lens drive unit 350 so that the refractive index of the refractive index-adjustable lens 300 remains at the set refractive index value or is changed at the set change speed.

As described above, the vision training is performed in consideration of the accommodation time for each refractive index value, so the vision training is performed in consideration of the accommodation time for the refractive index value of the user. Therefore, it is possible to more efficiently perform the vision training while strengthening the ciliary muscle through the vision training.

In the range in which the accommodation time is short, a time in which the eye of the user adapts to the target object is short, so the adaptability of the eye of the user is relatively high. Therefore, in the range in which the accommodation time is short, the width of the training range is set to be relatively large, and in the range in which the accommodation time is long, the width of the training range is set to be relatively small, so that the user can obtain the high training effect without being subject to the excessive load during training.

As described above, the continuous refractive index change speed of the refractive index-adjustable lens 300 in each training range, the intermittent waiting time, and the width of the training range are variably set in consideration of the accommodation time of the user, thereby the vision improving effect can be maximized The control unit 500 may set a near point of accommodation position D3 and a far point of accommodation position D4 within the accommodation range AR based on the accommodation time information in order to set the effective training range. The control unit 500 may set the near point of accommodation position D3 and the far point of accommodation position D4 by combining the width of the accommodation range AR and a value in which the characteristics according to the age of the user are considered. For example, when the accommodation range AR is wide, the fast accommodation range FAR may be set to be wider, and as the age increases, the width of the fast accommodation range FAR may be set to be narrower. A range between the near point of accommodation position D3 and the far point of accommodation position D4 is set as a fast accommodation range FAR, and ranges SAR1 and SAR 2 outside the fast accommodation range FAR within the accommodation range AR may be set as the slow accommodation ranges. The fast accommodation range FAR may also be set by selecting any one range between the measured positions (MP1 to MP10). The fast accommodation range FAR includes a range in which the eye of the user can perform the accommodation training comfortably and can be applied to a virtual reality (VR) technique as a way to reduce the eye fatigue arising during the vision training while feeling as if the training were not performed.

As another method, the control unit 500 may automatically set the near point of accommodation position D3 and the far point of accommodation position D4. A middle point of a statistically average accommodation range at the age of the user may be set as the user reference position, or a position at which the user can see most comfortably while the refractive index of the refractive index-adjustable lens 300 is being changed at a set refractive index change speed may be set as the user reference position in accordance with the input from the user input unit 130, and the control unit 190 may decide positions which are at a predetermined distance from the user reference position as the near point of accommodation position P3 and the far point of accommodation position P4. At this time, the near point of accommodation position D3 and far point of accommodation position D4 may be set based on the age of the user.

A near slow accommodation range SARI and a far slow accommodation range SAR2 are determined based on the determined near point of accommodation position D3 and the far point of accommodation position D4. The near slow accommodation range SARI includes a range between the first adjustment refractive index D5 and the near point of accommodation position D3, and the far slow accommodation range SAR2 includes a range between the second adjustment refractive index D6 and the far point of accommodation position D4. Each of the slow accommodation ranges SARI and SAR2 includes a range in which the range of the accommodation reserve power of the eye of the user is reflected. In a case in which the vision training is performed in the slow accommodation ranges SARI and SAR2, the vision of the user can be improved since the accommodation reserve power and the accommodation power of the user is further expanded.

In a case in which the near slow accommodation range SARI and the far slow accommodation range SAR2 are set, it is desirable for the control unit 500 to include at least a part of the near slow accommodation range SARI or the far slow accommodation range SAR2 in the training range. The training range may include only the fast accommodation range FAR, but it is further effective in improving the vision when a part of at least one of the near slow accommodation range SARI and the far slow accommodation range SAR2 is included in the training range.

The training range may be set to include a range between the near slow accommodation range SAR1 and the far slow accommodation range SAR2, a range between the near slow accommodation range SARI and the fast accommodation range FAR, or a range between the far slow accommodation range SAR2 and the fast accommodation range FAR. Of course, the near slow accommodation range (SARI) or the far slow accommodation range (SAR2) may be used themselves as the training range. The user can select any one of such training ranges or a combination thereof. If there is no selection from the user, the control unit 190 may arbitrarily set or select the training range.

When the training range is set, the control unit 500 controls the lens drive unit 350 such that the refractive index of the refractive index-adjustable lens 300 is changed within the training range. The control unit 500 can continuously or intermittently change the refractive index of the refractive index-adjustable lens 300. For example, the control unit 500 may repeatedly perform an operation of causing the refractive index of the refractive index-adjustable lens 300 to be continuously changed in a reciprocating manner within the training range or an operation of causing the refractive index of the refractive index-adjustable lens 300 to be set to a set refractive index and then being standby for a previously set time.

With such training, the ciliary muscle of the user contracts or relaxes and accommodates to the change in the refractive index of the refractive index-adjustable lens 300, so that the ciliary muscle is strengthened.

Upon completion of the vision training, the vision training device ends the training and stores training data in the memory 700. The training data includes time information until one cycle of training ends, a training mode, and optical information related to a training condition or the like. The training data is stored for each user, and the stored training data is analyzed to confirm a degree of improvement of the vision according to the training Therefore, the user can check the degree of improvement of the vision and then effectively set up a future training plan and a training direction.

The vision training device according to the present invention measures the first adjustment refractive index D5 and the second adjustment refractive index D6 corresponding to the status of personal vision of the user and sets the training range based on the first adjustment refractive index D5 and the second adjustment refractive index D6, thereby the vision improvement effect is high.

Figure 8:
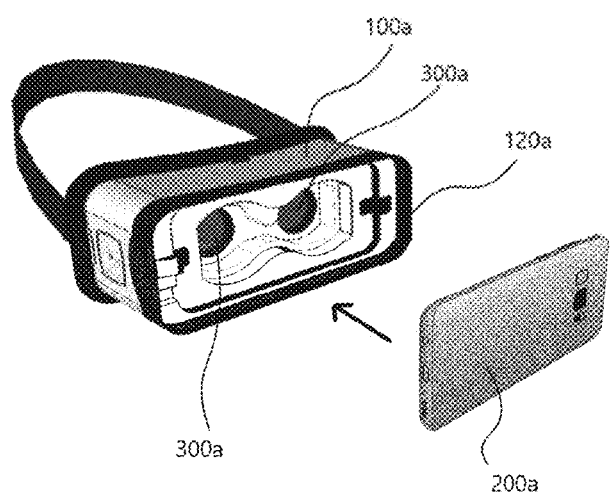
FIG. 8 is a perspective view illustrating a vision training device according to another embodiment of the present invention.

FIG. 8 is a perspective view illustrating a vision training device according to another embodiment of the present invention. As can be seen in FIG. 8, the vision training device according to the present embodiment includes a frame 100a having a mounting section 120a in which a display 200a capable of displaying a target image for vision training can be mounted. The display 200a can be detachably attached to the mounting section 120a. When the display 200a is fixed to the frame 100a, the target image is displayed at a constant distance, and thus the effective vision training is performed. Of course, the vision training can be performed even when the display 200a is removed.

The frame 100a includes eyepiece sections in which both eyes of the user are placed, and a refractive index-adjustable lens 300a having a refractive index adjusting unit which adjusts the refractive index with the supply of electric current is installed in each of the eyepiece sections. The vision training device according to the present invention includes a control unit that controls the voltage such that the refractive index of the refractive index-adjustable lens 300a is adjusted, sets the training range within the refractive index adjustment range of the refractive index-adjustable lens 300a, and adjusts the refractive index of the refractive index-adjustable lens in the training range. A training range setting method and a vision training process of the vision training device are similar to those described in FIGS. 1 to 7.

Figure 9A:
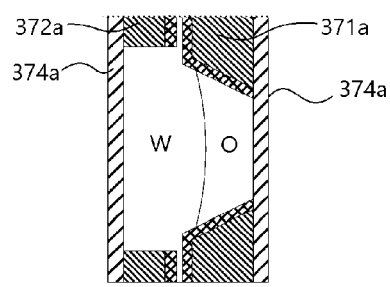
FIGS. 9(A) and 9(B) are explanatory diagrams illustrating a refractive index-adjustable lens according to another embodiment of the present invention.
Figure 9B:
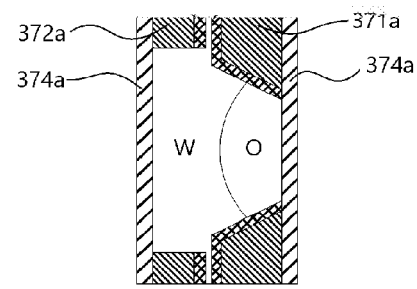

FIGS. 9(A) and 9(B) are explanatory views illustrating a refractive index-adjustable lens and a lens drive unit according to another embodiment of the present invention. As can be seen in FIGS. 9(A) and 9(B), the refractive index-adjustable lens according to the present invention may include a liquid lens including water (W) which is a transparent liquid-like polar substance and oil (o) which is a transparent liquid-like non-polar substance. The liquid lens includes a pair of transparent windows 374a facing each other with the water W and the oil O interposed therebetween, an insulator, and the like. The lens drive unit according to the present embodiment includes a pair of electrodes 371a and 372a and a voltage adjusting unit that are electrically connected to the water W which is a polar substance and are capable of changing the refractive index. A pair of electrodes 371a and 372a are positive and negative electrodes, and the voltage adjusting unit can adjust the intensity of the voltage applied to the refractive index-adjustable lens by adjusting the intensity of an electric current and/or the magnitude of resistance.

FIG. 9(A) illustrates a state before an electric current is supplied to the refractive index-adjustable lens, and FIG. 9(B) illustrates a state in which an electric current is supplied to the refractive index-adjustable lens. As can be seen in FIGS. 9(A) and 9(B), the shape of the water W which is a polar substance and the shape of the oil O which is a non-polar substance can be changed with the supply of electric current. The refractive index can be changed variously by adjusting the shape of the water W and the shape of the oil O with the applied voltage.

Components of the refractive index-adjustable lens can be variously changed depending on a design. One of various liquid lens types can be employed as the refractive index-adjustable lens. For example, a liquid lens capable of adjusting an amount of liquid substance inside the liquid lens, an amount of polar substance, an amount of non-polar substance, or the like with an electrical signal may be employed.

Meanwhile, the voltage may be applied to one or more electrodes 371a instead of a pair of electrodes. For example, any one of a pair of electrodes 371a and 372a may be omitted in FIGS. 9(A) and 9(B).

Further, in a lens module including a housing and a soft transparent film, the shape of the soft transparent film can be modified by adjusting internal pressure with physical or electrical driving power. At this time, at least one transparent fluid may be disposed inside the module including the housing and the soft transparent film.

What is claimed is:

1. A system comprising:
a chassis;
an optical lens included in the chassis, wherein: (a) the optical lens is configured to couple to an electric source, and (b) the optical lens has a refractive index configured to change in response to the electric source changing an electrical property of energy supplied to the optical lens;
at least one non-transitory machine-readable medium having stored thereon data which, when used by at least one machine, causes the at least one machine to perform operations comprising:
adjusting the refractive index across a plurality of refractive index values;
in response to adjusting the refractive index across a plurality of refractive index values, receiving: (a) a first communication regarding a lower end region of an accommodation range of a user, and (b) a second communication regarding an upper end region of the accommodation range of the user;
in response to receiving the first and second communications, determining the accommodation range for the user; and
conducting vision training of the user by adjusting the refractive index across at least two refractive index values that are inside the accommodation range.

2. The system of claim 1, the operations comprising:
adjusting the refractive index from a first measurement refractive index to a second measurement refractive index;
in response to adjusting to the second measurement refractive index, receiving a third communication regarding a first eye accommodation of the user;
determining a first amount of time between adjusting the first measurement refractive index to the second measurement refractive index and receiving the third communication regarding a first eye accommodation of the user.

3. The system of claim 2, the operations comprising:
adjusting the refractive index from a third measurement refractive index to a fourth measurement refractive index;
in response to adjusting to the fourth measurement refractive index, receiving a fourth communication regarding a second eye accommodation of the user;
determining a second amount of time between adjusting the third measurement refractive index to the fourth measurement refractive index and receiving the fourth communication regarding a second eye accommodation of the user.

4. The system of claim 3, wherein the first amount of time is less than the second amount of time.

5. The system of claim 4, wherein conducting vision training of the user by adjusting the refractive index includes:
maintaining the refractive index based on the first amount of time for a first duration of time before changing the refractive index; and
maintaining the refractive index based on the second amount of time for a second duration of time before changing the refractive index;
wherein the first duration of time is shorter than the second duration of time.

6. The system of claim 5, wherein:
the second measurement refractive index is a first distance to a midpoint of the accommodation range;
the fourth measurement refractive index is a second distance to the midpoint of the accommodation range;
the first distance is less than the second distance.

7. The system of claim 4, wherein conducting vision training of the user by adjusting the refractive index includes:
transitioning the refractive index between two refractive index values at a first speed;
transitioning the refractive index between an additional two refractive index values at a second speed;
wherein the first speed is greater than the second speed.

8. The system of claim 7, wherein:
one of the two refractive index values is a first distance to a midpoint of the accommodation range;
one of the additional two refractive index values is a second distance to the midpoint of the accommodation range;
the first distance is less than the second distance.

9. The system of claim 7 wherein:
transitioning the refractive index between two refractive index values at a first speed includes traversing a first distance between the two refractive index values;
transitioning the refractive index between an additional two refractive index values at a second speed includes traversing a second distance between the additional two refractive index values.

10. The system of claim 9, wherein the first distance is greater than the second distance.

11. The system of claim 7 wherein:

transitioning the refractive index between two refractive index values at a first speed includes traversing a first distance between the two refractive index values over a first duration of time;
transitioning the refractive index between an additional two refractive index values at a second speed includes traversing a second distance between the additional two refractive index values over a second duration of time;
the first duration of time is less than the second duration of time.

12. The system of claim 4, wherein conducting vision training of the user by adjusting the refractive index includes:
transitioning the refractive index between two immediately adjacent refractive index values;
transitioning the refractive index between an additional two immediately adjacent refractive index values;
the two immediately adjacent refractive values are separated from each other by a first distance;
the additional two immediately adjacent refractive values are separated from each other by a second distance;
the first distance is shorter than the second distance.

13. The system of claim 12, wherein:
one of the two refractive index values is a third distance to a midpoint of the accommodation range;
one of the additional two refractive index values is a fourth distance to the midpoint of the accommodation range;
the third distance is larger than the fourth distance.

14. The system of claim 1, wherein conducting vision training of the user by adjusting the refractive index includes adjusting the refractive index across at least two refractive index values that are outside the accommodation range.

15. At least one non-transitory machine-readable medium having stored thereon data which, when used by at least one machine, causes the at least one machine to perform operations comprising:
adjusting a refractive index across a plurality of refractive index values, wherein: (a) the refractive index corresponds to an optical lens, and (b) the refractive index is configured to change in response to a change in an electrical property of energy supplied by an electric source coupled to the optical lens;
in response to adjusting the refractive index across a plurality of refractive index values, receiving: (a) a first communication regarding a lower end region of an accommodation range of a user, and (b) a second communication regarding an upper end region of the accommodation range of the user;
in response to receiving the first and second communications, determining the accommodation range for the user;
conducting vision training of the user by adjusting the refractive index across at least two refractive index values that are inside the accommodation range.

16. The at least one non-transitory machine-readable medium of claim 15, the operations comprising:
adjusting the refractive index from a first measurement refractive index to a second measurement refractive index;
in response to adjusting to the second measurement refractive index, receiving a third communication regarding a first eye accommodation of the user;
determining a first amount of time between adjusting the first measurement refractive index to the second measurement refractive index and receiving the third communication regarding a first eye accommodation of the user;
adjusting the refractive index from a third measurement refractive index to a fourth measurement refractive index;
in response to adjusting to the fourth measurement refractive index, receiving a fourth communication regarding a second eye accommodation of the user;
determining a second amount of time between adjusting the third measurement refractive index to the fourth measurement refractive index and receiving the fourth communication regarding a second eye accommodation of the user;
wherein the first amount of time is less than the second amount of time.

17. The at least one non-transitory machine-readable medium of claim 16, wherein conducting vision training of the user by adjusting the refractive index includes:
maintaining the refractive index based on the first amount of time for a first duration of time before changing the refractive index; and
maintaining the refractive index based on the second amount of time for a second duration of time before changing the refractive index;
wherein the first duration of time is shorter than the second duration of time.

18. The at least one non-transitory machine-readable medium of claim 17, wherein:
the second measurement refractive index is a first distance to a midpoint of the accommodation range;
the fourth measurement refractive index is a second distance to the midpoint of the accommodation range;
the first distance is less than the second distance.

19. The at least one non-transitory machine-readable medium of claim 16, wherein conducting vision training of the user by adjusting the refractive index includes:
transitioning the refractive index between two refractive index values at a first speed;
transitioning the refractive index between an additional two refractive index values at a second speed;
wherein the first speed is greater than the second speed.

20. At least one non-transitory machine-readable medium having stored thereon data which, when used by at least one machine, causes the at least one machine to perform operations comprising:
changing an electrical property of energy supplied to an optical lens;
adjusting a refractive index of the lens across refractive index values in response to changing the electrical property;
in response to adjusting the refractive index across refractive index values, receiving: (a) a first signal regarding a lower end region of an accommodation range of a user, and (b) a second signal regarding an upper end region of the accommodation range;
in response to receiving the first and second signals, determining the accommodation range;
conducting vision training by adjusting the refractive index across at least two refractive index values that are inside the accommodation range.

21. The at least one non-transitory machine-readable medium of claim 20, the operations comprising:
adjusting the refractive index from a first measurement refractive index to a second measurement refractive index;

in response to adjusting to the second measurement refractive index, receiving a third signal regarding eye accommodation;

determining a first amount of time between adjusting the first measurement refractive index to the second measurement refractive index and receiving the third signal;

adjusting the refractive index from a third measurement refractive index to a fourth measurement refractive index;

in response to adjusting to the fourth measurement index, receiving a fourth signal regarding eye accommodation;

determining a second amount of time between adjusting the third measurement refractive index to the fourth measurement refractive index and receiving the fourth signal;

wherein the first amount of time is less than the second amount of time.

22. The at least one non-transitory machine-readable medium of claim 21, wherein conducting vision training of the user by adjusting the refractive index includes:

maintaining the refractive index based on the first amount of time for a first duration of time before changing the refractive index; and maintaining the refractive index based on the second amount of time for a second duration of time before changing the refractive index;

wherein the first duration of time is shorter than the second duration of time.

\* \* \* \* \*